United States Patent
Jones et al.

(10) Patent No.: US 9,396,584 B2
(45) Date of Patent: Jul. 19, 2016

(54) OBTAINING GEOGRAPHIC-LOCATION RELATED INFORMATION BASED ON SHADOW CHARACTERISTICS

(71) Applicant: Google Inc., Mountain View, CA (US)

(72) Inventors: Jonah Jones, San Francisco, CA (US); Steven Maxwell Seitz, Seattle, WA (US)

(73) Assignee: Google Inc., Mountain View, CA (US)

( * ) Notice: Subject to any disclaimer, the term of this patent is extended or adjusted under 35 U.S.C. 154(b) by 158 days.

(21) Appl. No.: 14/134,751

(22) Filed: Dec. 19, 2013

(65) Prior Publication Data

US 2015/0178926 A1  Jun. 25, 2015

(51) Int. Cl.
*G06K 9/00* (2006.01)
*G06T 17/05* (2011.01)

(52) U.S. Cl.
CPC .............. *G06T 17/05* (2013.01); *G06K 9/0063* (2013.01)

(58) Field of Classification Search
None
See application file for complete search history.

(56) References Cited

U.S. PATENT DOCUMENTS

| | | | |
|---|---|---|---|
| 7,421,341 B1 * | 9/2008 | Hopkins et al. ............... | 701/533 |
| 7,639,878 B2 | 12/2009 | Ibrahim et al. | |
| 7,856,312 B2 * | 12/2010 | Coombes et al. ............. | 701/532 |
| 2006/0004514 A1 * | 1/2006 | Bennett et al. ................ | 701/208 |
| 2006/0239537 A1 * | 10/2006 | Shragai et al. ................ | 382/154 |
| 2011/0142347 A1 * | 6/2011 | Chen et al. .................... | 382/190 |
| 2013/0071016 A1 | 3/2013 | Omer et al. | |

FOREIGN PATENT DOCUMENTS

CN  102855627 A  1/2013

OTHER PUBLICATIONS

Reilly, Vladimir, Berkan Solmaz, and Mubarak Shah. "Shadow casting out of plane (SCOOP) candidates for human and vehicle detection in aerial imagery." International journal of computer vision 101.2 (2013): 350-366. Published online: Oct. 12, 2012.*
Cheraghi, Seyed Ali, and Usman Ullah Sheikh. "Moving object detection using image registration for a moving camera platform." Control System, Computing and Engineering (ICCSCE), 2012 IEEE International Conference on. IEEE, 2012.*
Rodríguez-Canosa, Gonzalo R., et al. "A real-time method to detect and track moving objects (DATMO) from unmanned aerial vehicles (UAVs) using a single camera." Remote Sensing 4.4 (2012): 1090-1111.*
"Geometric Constraints for Human Detection in Aerial Imagery", downloaded from http://vision.eecs.uctedu/projects/Human%20Detection/, 2010.
Chung, "Efficient Shadow Detection of Color Aerial Images Based on Successive Thresholding Scheme", IEEE Transactions on Geoscience and Remote Sensing, vol. 47, No. 2, Feb. 2009.
Reilly, et al., "Geometric Constraints for Human Detection in Aerial Imagery", The 11th European Conference on Computer Vision (ECCV), 2010.

(Continued)

*Primary Examiner* — Xiao Wu
*Assistant Examiner* — Yu Chen
(74) *Attorney, Agent, or Firm* — Lerner, David, Littenberg, Krumholz & Mentlik, LLP

(57) ABSTRACT

A system and method is provided for determining whether images of a geographic location identify features with characteristics consistent with shadows cast by people, and using such determination to annotate map information. If such features are identified at the location, the map may be annotated to indicate that the location is frequented by pedestrians.

18 Claims, 9 Drawing Sheets

(56) References Cited

OTHER PUBLICATIONS

Reilly, et al., "Shadow Casting Out of Plance (SCOOP) Candidates for Human and Vehicle Detection in Aerial Imagery", 2013, Published online: Oct. 12, 2012.

Tsai, "Automated Shadow Compensation in Color Aerial Images", ASPRS 2006 Annual Conference, May 1-5, 2006.

Watanabe, et al., "Detecting changes of buildings from aerial images using shadow and shading model", 1998.

* cited by examiner

US 9,396,584 B2

OBTAINING GEOGRAPHIC-LOCATION RELATED INFORMATION BASED ON SHADOW CHARACTERISTICS

BACKGROUND

Certain existing map systems are capable of delivering map information in a variety of formats, such as vector-based street maps, satellite imagery, and hybrids thereof. The visual map information may be supplemented with descriptive information, such as the name and type of local points of interest. For instance, a local point of interest may identify the name and location of a park, as well as information regarding when the park is open to the public.

Different sources may provide such descriptive information. By way of example, a web service may permit a user may create a listing that is associated with a particular geographic location, and enter descriptive information such as the name and hours of operation. By way of further example, other descriptive information may also be obtained from third-party data providers (e.g., databases of restaurants), optical character recognition (e.g., using OCR to identify, from a street level image capturing a storefront, hours of operation painted on the door of the store) or extracted from a website (e.g., a business' home page).

BRIEF SUMMARY

In one aspect, a method for displaying maps is provided that includes determining, by one or more computing devices, whether an image of a geographic location contains a feature having image characteristics consistent with image characteristics of a person's shadow. The image characteristics of a person's shadow may be based at least in part on a time associated with the image. Visual indicia is then generated based at least in part on the determination of whether the image contains a feature having image characteristics consistent with the image characteristics of a person's shadow. A map of the geographic location and the visual indicia may also be generated and provided for display by one or more computing devices In another aspect, a system is provided that includes one or more computing devices and memory containing instructions executable by the one or more computing devices. The instructions may include: determining the likelihood that a geographic location is accessible by the public based at least in part on whether an image of the geographic location contains a feature visually similar to the expected visual characteristics of a person's shadow at the time the image was captured and; providing, for display, a map of the map of the geographic location and visual indicia based at least in part on the determined likelihood.

In still another aspect, a method is provided that includes determining, by one or more computing devices: the expected size and orientation of a person's shadow that may appear in first and second aerial images based on the time that the images were captured; the geographic location of features within the first and second images that are similar to the expected size and orientation of a person's shadow and; whether the first and second image capture shadows of people based at least in part on comparing the geographic locations of features within the first image that are similar to the expected size and orientation of a person's shadow with the geographic locations of features within the second image that are similar to the expected size and orientation of a person's shadow. The method may further include providing for display, in response to receiving a request from a user for information relating to a geographic location, information regarding whether the location is frequented by people based at least in part on the determination of whether the first and second image capture shadows of people.

DETAILED DESCRIPTION

Overview

Figure 1:
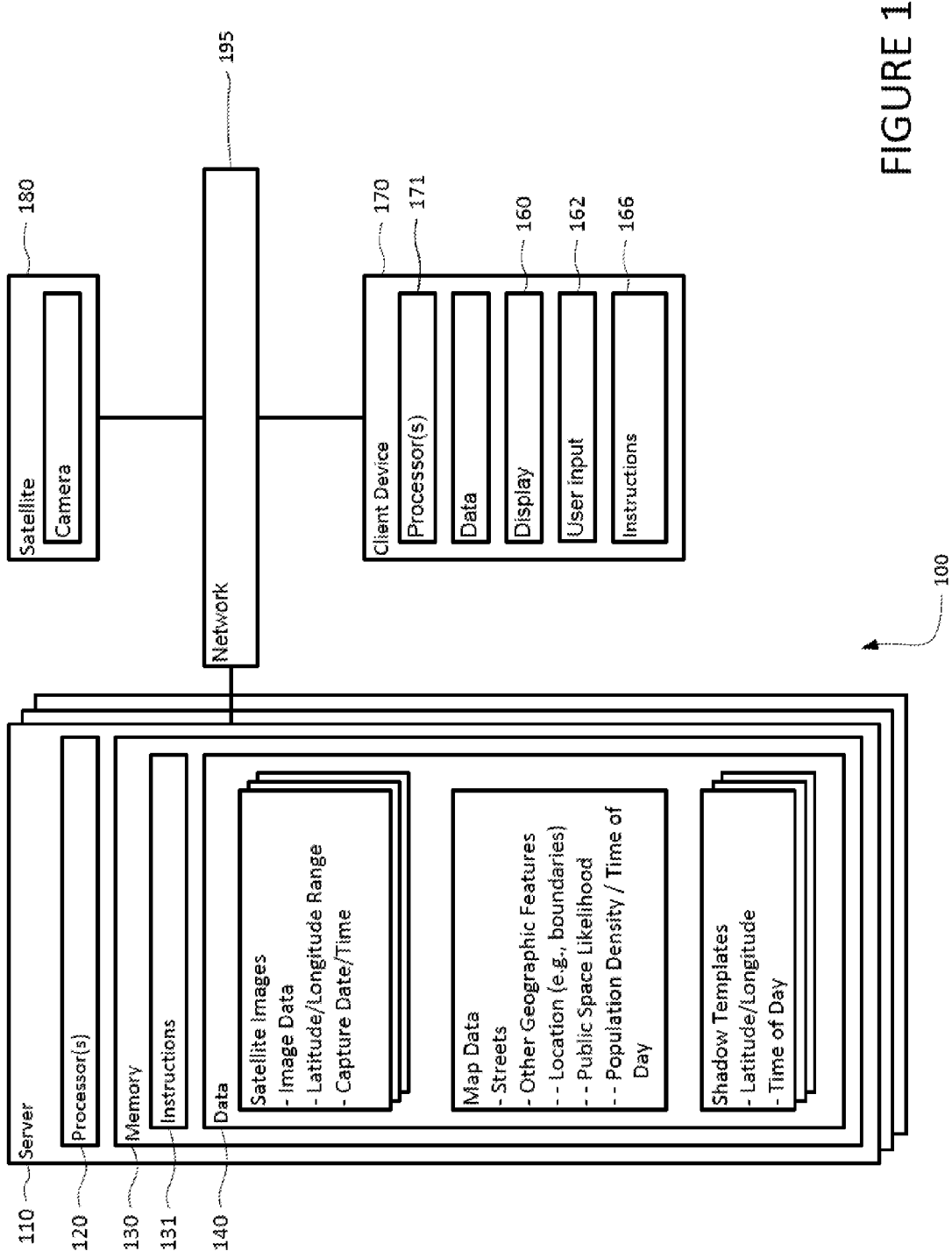
FIG. 1 is a functional diagram of a system in accordance with an aspect of the system and method.

To start, images capturing a geographic location may be processed to identify features with characteristics consistent with shadows cast by people, and such identification may be used to augment map information. As an example, a user may view a map of a location that is relatively distant from streets. If such features have been identified at the location, the map may be annotated to indicate that the location is frequented by pedestrians. For instance, the shadow-related features may be used to determine whether the location is a publicly-accessible area such as a park or beach. The user may also receive other information about the location, such as its popularity with pedestrians at different times of day or year.

In one possible embodiment, aerial images are analyzed to determine whether the images contain features that are visually similar to shadows of people. For example, the devices may determine whether an image contains one or more features consistent with the shadow of a person that is standing or walking and approximately 5-6 feet tall. A template of image characteristics for such a shadow may be prepared based on the size of the area captured in the image, the camera angle, the latitude/longitude of the image, and the time that the image was taken (e.g., time of day and a day of the year). The template may be shaped like the profile of a person or, more simply, a line segment whose size and angle relative to the image is expected to roughly match the size and angle of a shadow cast by an average-sized adult at the location's latitude/longitude, as well as the time that the image was captured. Features that are determined to be visually similar to the template may be identified as potential shadows of people (hereafter for ease of reference, "candidate features"). The expected position of the object that cast the potential shadow may be determined based on the assumption that the candidate feature is indeed a shadow. For example, the caster's position may be estimated to be at the portion of the shadow that is closest to the position of the sun.

Other aerial images of the location taken at different times may be similarly analyzed, and the candidate features found in a later image may be compared with the candidate features found in an earlier image. If a candidate feature identified in an earlier image meets any of the following criteria, the system may assume that the candidate feature in the earlier image is not a person's shadow: (a) the candidate feature appears in the later image at the same spot with the same shape and orientation (e.g., the candidate feature may be an image of a fixed object); and (b) there is a shadow in the later image having the same expected caster position as the candidate feature (e.g., the object casting the shadow is likely fixed in place). If a candidate feature is not eliminated as a candidate by the foregoing or other criteria, the system may validate the candidate feature as likely to be a person's shadow.

The location of each validated shadow and the time at which it was captured may be stored and analyzed. By way of example, if a significant number of validated shadows are routinely found within a particular area, the system may identify the area as being routinely frequented by pedestrians. If validated shadows are almost never found in a particular area, the system may identify the area as being unpopular with pedestrians (e.g., pedestrian traffic may be prohibited within that area). If the quantity of validated shadows within an area changes over the course of a day, but is relatively constant at a particular time of day, the system may identify the busiest and slowest times of day. This information may be conveyed to users later viewing a map of the location, e.g., the map may be annotated to identify the busiest and slowest times of day, or a table may be displayed to the user that lists the relative popularity of the location by hour of the day. If live aerial imagery is available, the system may also provide live updates regarding the amount of people estimated to be at a location.

Validated shadow information may also be used as a signal in combination with other signals to identify the nature of the location. For example, if an area is popular at midday, relatively vacant at dawn and dusk, and adjacent to a body of water, the system may identify the area as a beach. Similarly, if the area extends across a park, is approximately the width of a sidewalk, is popular on weekends but relatively vacant during the week, the system may identify the area as a hiking trail.

Example Systems

FIG. 1 illustrates one possible system 100 in which the aspects disclosed herein may be implemented. In this example, system 100 may include computing devices 110 and 170. Computing devices 110 may contain one or more processors 120, memory 130 and other components typically present in general purpose computing devices. Although FIG. 1 functionally represents each of the processor 120 and memory 130 as a single block within device 110, which is also represented as a single block, the system may include and the methods described herein may involve multiple processors, memories and devices that may or may not be stored within the same physical housing. For instance, various methods described below as involving a single component (e.g., processor 120) may involve a plurality of components (e.g., multiple computing devices distributed over a network of computing devices, computers, "racks," etc. as part of a parallel or distributed implementation. Further, the various functions performed by the embodiments may be executed by different computing devices at different times as load is shifted from among computing devices). Similarly, various methods described below as involving different components (e.g., device 110 and device 170) may involve a single component (e.g., rather than device 170 performing a determination described below, device 170 may send the relevant data to device 110 for processing and receive the results of the determination for further processing or display).

Memory 130 of computing device 110 may store information accessible by processor 120, including instructions 131 that may be executed by the processor 120. Memory 130 may also include data 118 that may be retrieved, manipulated or stored by processor 120. Memory 130 and the other memories described herein may be any type of storage capable of storing information accessible by the relevant processor, such as a hard-disk drive, a solid state drive, a memory card, RAM, DVD, write-capable memory or read-only memory. In addition, the memory may include a distributed storage system where data, such as data 140, is stored on a plurality of different storage devices which may be physically located at the same or different geographic locations.

The instructions 131 may be any set of instructions to be executed by one or more processor(s) 120 or other computing device. In that regard, the terms "instructions," "application," "steps" and "programs" may be used interchangeably herein. The instructions may be stored in object code format for immediate processing by a processor, or in another computing device language including scripts or collections of independent source code modules, that are interpreted on demand or compiled in advance. Functions, methods and routines of the instructions are explained in more detail below. Processor(s) 120 may each be any conventional processor, such as a commercially available central processing unit (CPU) or graphics processing unit (GPU). Alternatively, the processor may be a dedicated component such as an ASIC or other hardware-based processor.

Data 140 may be retrieved, stored or modified by computing device 110 in accordance with the instructions 131. For instance, although the subject matter described herein is not limited by any particular data structure, the data may be stored in computer registers, in a relational database as a table having many different fields and records, or XML documents. The data may also be formatted in any computing device-readable format such as, but not limited to, binary values, ASCII or Unicode. Moreover, the data may comprise any information sufficient to identify the relevant information, such as numbers, descriptive text, proprietary codes, pointers, references to data stored in other memories such as at other network locations, or information that is used by a function to calculate the relevant data.

The computing device 110 may be at one node of a network 195 and capable of directly and indirectly communicating with other nodes of network 195. Although only a few computing devices are depicted in FIG. 1, a typical system may include a large number of connected computing devices, with each different computing device being at a different node of the network 195. The network 195 and intervening nodes described herein may be interconnected using various protocols and systems, such that the network may be part of the Internet, World Wide Web, specific intranets, wide area networks, or local networks. The network may utilize standard communications protocols, such as Ethernet, Wi-Fi and HTTP, protocols that are proprietary to one or more companies, and various combinations of the foregoing. As an example, computing device 110 may be a web server that is capable of communicating with computing device 170 via the network 195. Computing device 170 may be a client computing device, and server 110 may provide information for display by using network 195 to transmit and present information to a user of device 170 via display 160. Although certain advantages are obtained when information is transmitted or received as noted above, other aspects of the subject matter described herein are not limited to any particular manner of transmission of information.

Computing device 170 may be configured similarly to the server 110, with a processor, memory and instructions as described above. Computing device 170 may be a personal computing device intended for use by a user and have all of the components normally used in connection with a personal computing device such as a CPU or GPU, memory storing data and instructions, a display such as display 160 (e.g., a monitor having a screen, a touch-screen, a projector, a television, or other device that is operable to display information), and user input device 162 (e.g., a mouse, keyboard, touch-screen, microphone, etc.). Computing device 170 may also comprise a mobile computing device capable of wirelessly exchanging data with a server over a network such as the Internet. By way of example only, device 170 may be a mobile phone or a device such as a wireless-enabled PDA, a tablet PC, a wearable computing device or a netbook that is capable of obtaining information via the Internet. The device may be configured to operate with an operating system such as Google's Android operating system, Microsoft Windows or Apple iOS. In that regard, some of the instructions executed during the operations described herein may be provided by the operating system whereas other instructions may be provided by an application installed on the device. Computing devices in accordance with the systems and methods described herein may include other devices capable of processing instructions and transmitting data to and from humans and/or other computers including network computers lacking local storage capability and set top boxes for televisions.

Server 110 may store map-related information, at least a portion of which may be transmitted to a client device. The map information is not limited to any particular format. For instance, the map data may include bitmap images of geographic locations such as photographs captured by satellite 180 and/or aerial vehicles such as airplanes. The map data may also include information that may be rendered as images in advance or on demand, such as storing street locations and pedestrian trails as vectors, and street and trail names as text.

Map features may be associated with geographic locations. Locations may also be expressed in various ways including, by way of example only, latitude/longitude, a street address, x-y coordinates relative to edges of a map (such as a pixel position relative to the edge of a street map), and other reference systems capable of identifying geographic locations (e.g., lot and block numbers on survey maps). Moreover, a location may define a range of the foregoing. For example, a satellite image may be associated with a set of vertices defining the boundaries of an area, such as storing the latitude/longitude of each location captured at the corner of the image. The system and method may further translate locations from one reference system to another. For example, the server 110 may access a geocoder to convert a location identified in accordance with one reference system (e.g., a street address such as "1600 Amphitheatre Parkway, Mountain View, Calif.") into a location identified in accordance with another reference system (e.g., a latitude/longitude coordinate such as (37.423021°, −122.083939°)). In that regard, locations received or processed in one reference system may also be received or processed in other references systems.

The map data may also include descriptions of geographic locations. For example, the map data may include listings that are associated with particular geographic locations, as well as information such as a title (e.g., "Main Street Park") and categories (e.g., "park", "beach", "private" and "public"). The listing information may be compiled by automatically gathering information, such as from websites or directories, or entered by users. As described below, certain listing information may also be extracted from an image of the geographic location. Accordingly, the listing information may be obtained from various sources and contain potentially overlapping information.

Example Methods

Operations in accordance with a variety of aspects of embodiments will now be described. It should be understood that the following operations do not have to be performed in the precise order described below. Rather, various steps can be handled in reverse order or simultaneously.

Figure 2:
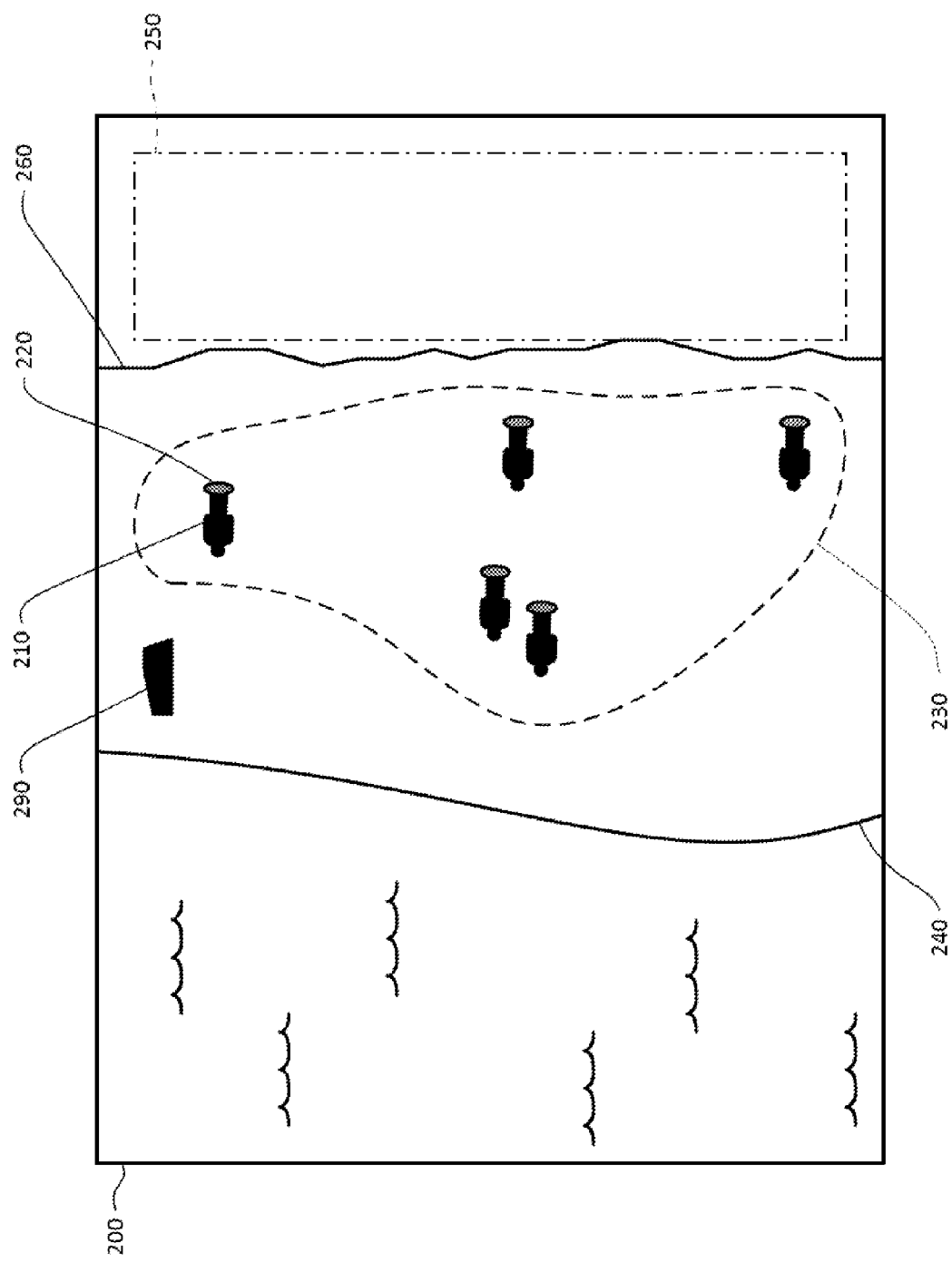
FIG. 2 is a schematic representation of a satellite image.

In one aspect, satellite images may be analyzed to determine whether the images contain features visually similar to shadows of people. FIG. 2 provides a schematic representation of such an image, namely a photographic image 200 captured by satellite 180. The image captures a variety of visual features, which for the purpose of this example includes a shadow 210 cast by person 220, the outline 290 of a fixed object such as a rock, the curved line 240 where the beach meets the ocean, and a fence 260. Along with the captured image 200, the system may store the time that the image was captured, which for the purposes of this example image will be assumed to be in the morning. Data 140 may also identify the location captured by the image as a set of latitude/longitude coordinates, e.g., the latitude/longitude of each of the four locations captured at the four corners of the image.

The system may determine the expected visual characteristics of a person's shadow within the image being analyzed. By way of example, device 110 may compare features of the image with a template, such as a line segment that is sized and oriented to be similar to the characteristics of a shadow of a standing or walking person approximately 1.5-1.9 meters tall. The size of the shadow template may be based on the time of day and geographic coordinates of the image capture. For instance, on a flat, non-inclined surface, the length of a person's shadow in the morning and afternoon is longer than their height at noon. The device may further calculate the expected length of a person's shadow based on the calendar day and latitude.

Figure 3:
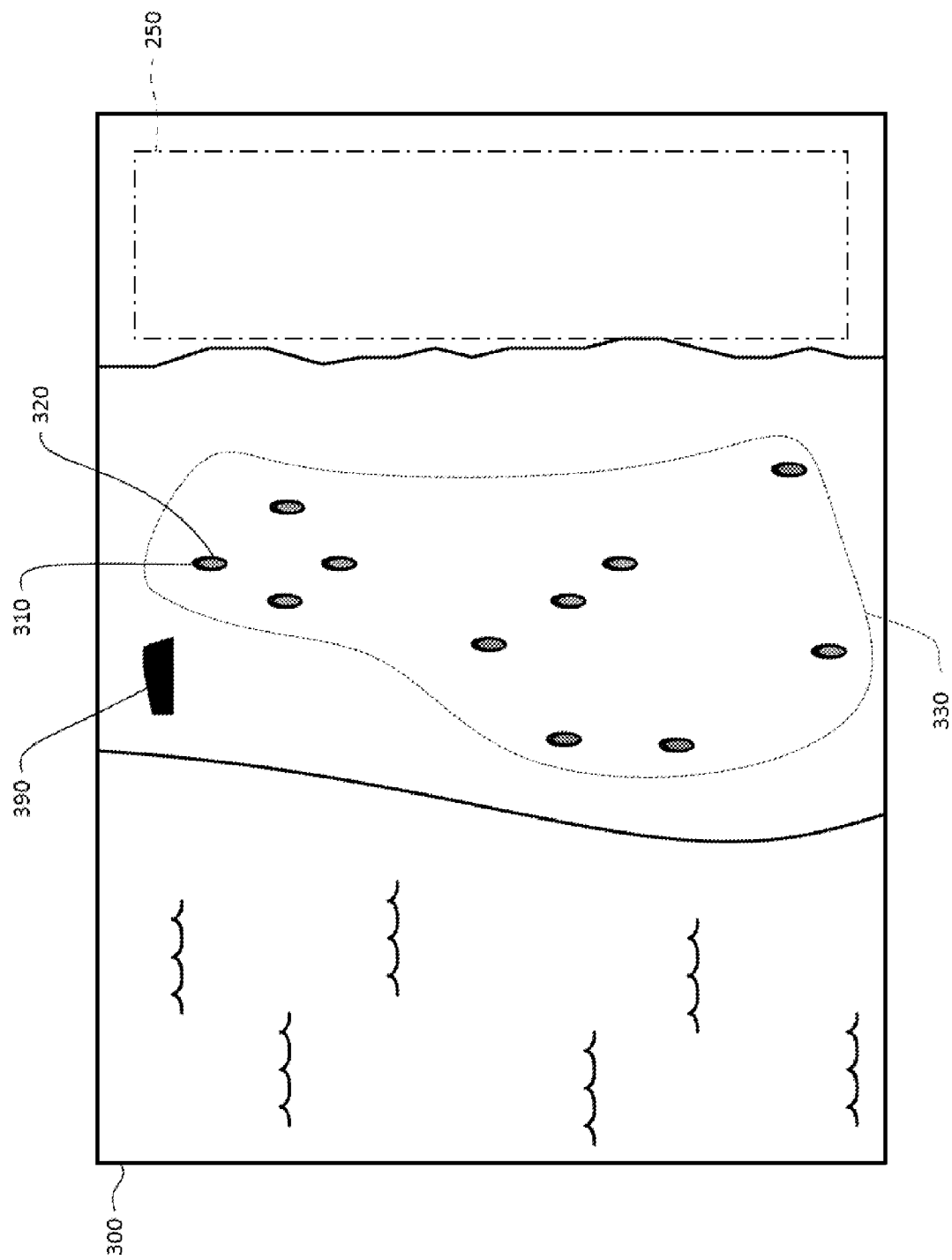
FIG. 3 is a schematic representation of a satellite image.
Figure 4:
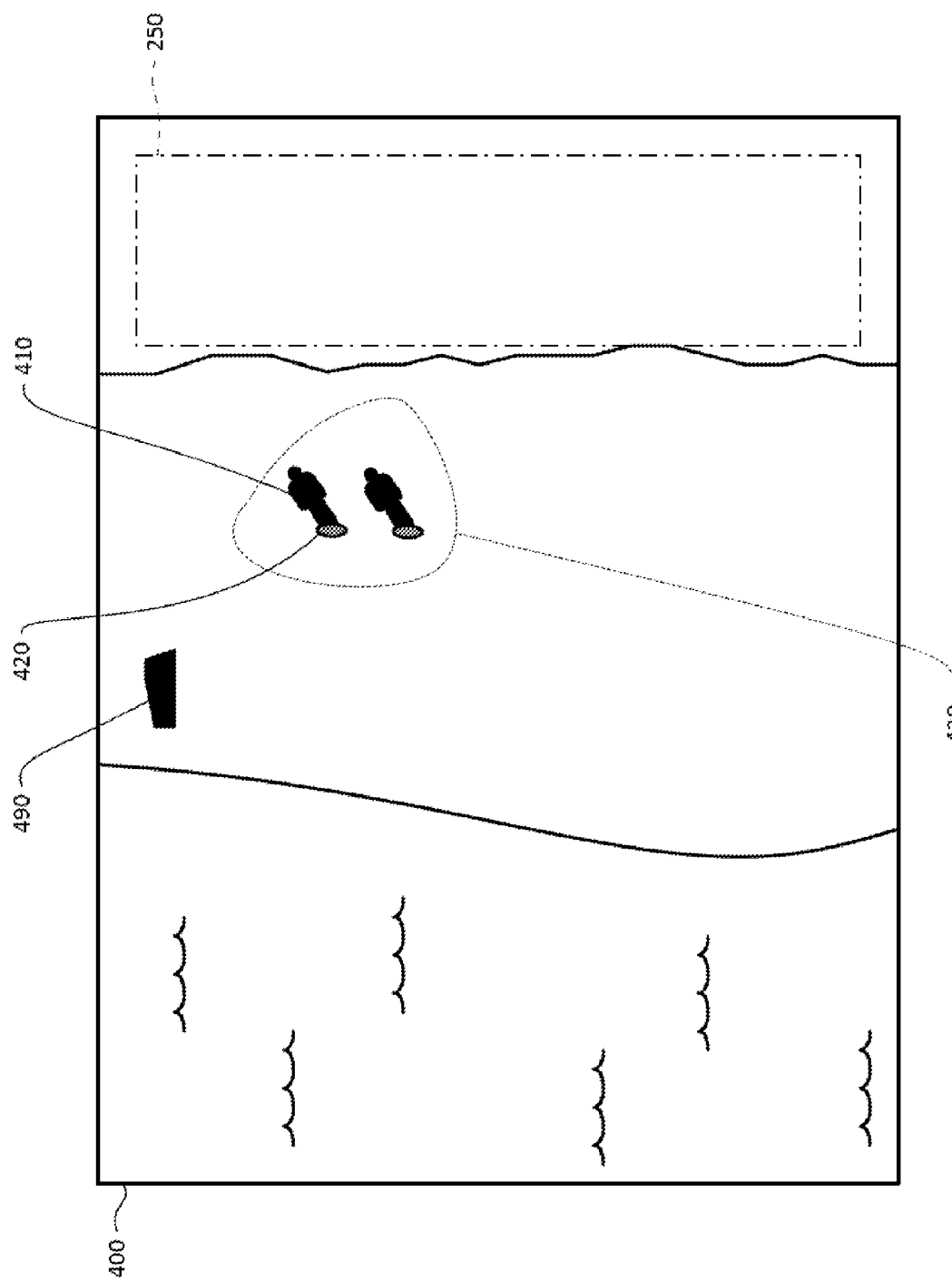
FIG. 4 is a schematic representation of a satellite image.

FIG. 3 is a schematic representation of a photographic image 300 of the same geographic location captured in image 200, except the image was captured later the same day at noon. As a result, the shadow 310 cast by a person 320 in image 300 is shorter than the shadow 210 cast by a person 220 in image 200. As a result, the shadow 310 cast by a person 320 in image 300 is shorter than the shadow 210 cast by a person 220 in image 200. FIG. 4 is a schematic representation of a photographic image 400 of the same geographic location captured in the afternoon on the same day as images 200 and 300.

The expected height and width of a shadow may be determined relative to a format consistent with the image data format. For instance, if the image is stored as a bitmap of pixels, a pixel-to-distance ratio for the image may be calculated based on the pixel width and height of the image relative to the width and height of the geographic area captured in the image. The width and height of the area may be determined based on the distance between the latitude/longitude coordinates of the corners of the image. The pixel/distance ratio may then be used to determine the expected pixel height (e.g., 1.7 m*pixel/distance) and width (e.g., 0.5 m*pixel/distance) of a typical person's shadow.

The system may also determine the expected orientation of shadows, and include this information in the shadow template. By way of example, FIG. 4 is a schematic representation of a photographic image 400 of the same geographic location captured in image 200, except the image was captured in the afternoon. The lengths of the shadows 210 and 410 cast by people 220 and 420 are not dramatically different, but the angles of the shadows relative to latitude/longitude lines have changed as a result of the change of the position of the sun from morning to afternoon. The system may thus determine the expected orientation of a shadow based on the position of the sun at the time the image was captured. For instance, the may determine the expected orientation based on a time of day (e.g., 9:00 a.m.), a calendar day (e.g., July 1), a specific date (e.g., Jul. 1, 2013) or any combination of thereof (e.g., Jul. 1, 2013 at 9:00 a.m.). The position of the sun may be calculated based on the time that the image was captured, as well as the latitude range captured in the image. The position of the satellite camera may also be also be used to determine the orientation of the shadow, e.g., the edge of a satellite image relative to latitude/longitude lines may depend on the latitude/longitude position of the satellite at the time the image was captured. The orientation of the shadow template may thus be normalized relative to a common reference, such as latitude/longitude lines or the edges of the image.

Figure 5:
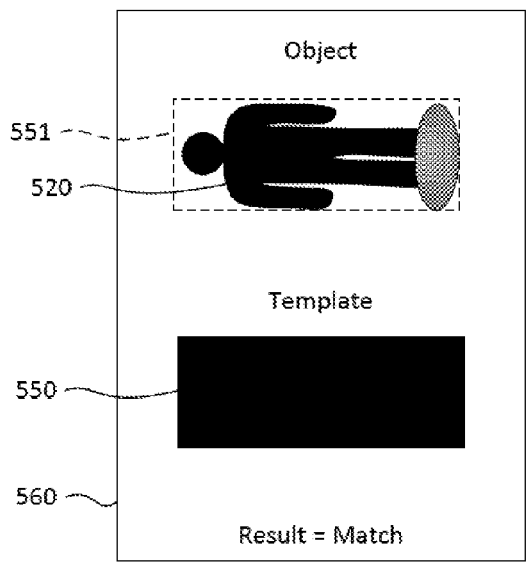
FIG. 5 is a diagram illustrating a comparison between an image feature of a satellite image with a template for a shadow.

Device 110 may analyze the images to identify candidate features, e.g., visual features that are similar to the characteristics defined by the shadow template. FIG. 5 illustrates a shadow template 550 calculated for image 200 (image 200 is shown in FIG. 2). The template is a line segment oriented relative to the edges of the image, the orientation of which is diagrammatically represented by edges 560. A convolution filter may be used to identify features that are similar to the template. For example, points along the edges of the template may be considered to have a value of −1 and points within the template may be considered to have a value of 1. If the shadow pixel values are near-zero (dark), the −1 filter elements may multiply (near) zeros, and the 1 filter elements may multiply the non-zero elements of the image, resulting in a relatively large response compared to other areas. The device may apply the template 550 to different portions of the image 200, eventually comparing the template with the visual feature formed by the combination of shadow 210 and 220 shown in FIG. 2 and collectively illustrated in FIG. 5 as feature 520. As can be seen by reference lines 551, which reflect the size and orientation of the shadow template, the feature occupies a substantial portion of the area of the template without going beyond the edges. As a result, the device 110 may consider the feature 520 to be sufficiently similar to the template 550 to qualify as a candidate feature.

Figure 7:
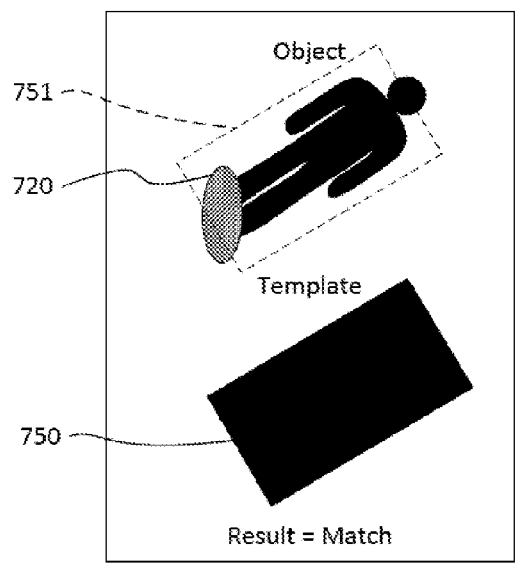
FIG. 7 is a diagram illustrating a comparison between an image feature of a satellite image with a template for a shadow.

FIG. 7 illustrates a comparison of shadow template 750 to features in image 400 (image 400 is shown in FIG. 4). Because image 400 was captured later than image 200, the size, dimensions and orientation of template 750 are different than template 550. Accordingly, whereas feature 720, which is a combination of shadow 410 and person 420, would not match well with shadow template 550, it does match well with shadow template 750, 751.

Multiple shadow templates of different sizes may be used to represent a range of sizes for people. Moreover, rather than a line segment, a shadow template may define the outline of person's shadow, distinguishing a head, arms and legs separately from a torso. Object recognition and matching methods may be used to identify features that are similar to such templates.

Figure 6:
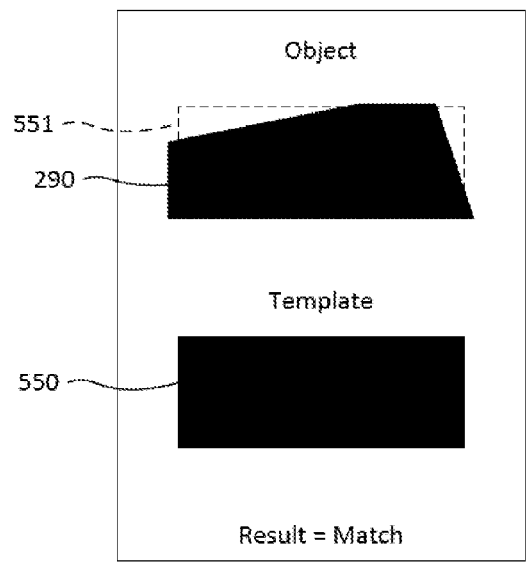
FIG. 6 is a diagram illustrating a comparison between an image feature of a satellite image with a template for a shadow.

Features may be confirmed or eliminated as candidates by comparing aerial images of the same location taken at different times. By way of example and as shown in FIG. 6, image 200 also captured feature 290, which is a fixed object. Device 110 may determine that the feature 290 is a candidate feature of image 200 because the feature's height, width and orientation are substantially similar to the height, width and orientation of template 550 as shown by reference lines 551. Therefore, device 110 may identify feature 290 as a candidate feature of image 200. When analyzing image 400, which was taken of the same location at a different time of day, device 110 may check whether any of the candidate features captured in earlier image 200 remain in place and unchanged. For example, upon identifying candidate feature 490 in image 400, device 110 may confirm that a nearly identical feature 290 was found at the same geographic location in image 200. The device may accordingly consider neither feature 290 nor feature 490 to be a candidate feature because the features likely represent a fixed object.

Figure 8:
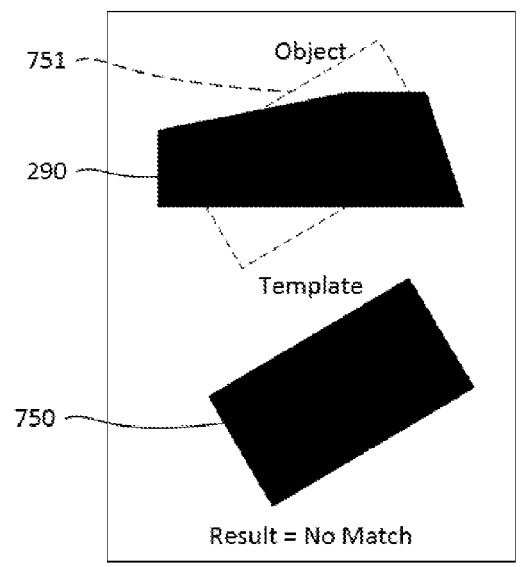
FIG. 8 is a diagram illustrating a comparison between an image feature of a satellite image with a template for a shadow.

FIG. 8 illustrates another manner in which feature 290 may be eliminated as a candidate feature. As noted above in connection with FIG. 6, feature 290 sufficiently matches the template 550 that was generated in connection with image 200. However, feature 290 does not match the template 750 that was generated in connection with image 400. Accordingly, if the computing device determines that there are two nearly identical features at the same location in both images, and one of the features matches the shadow template in one image but the other does not, the device may eliminate the matching feature from the list of candidate features.

The system may also determine the likely position of a shadow's caster, assuming the candidate feature is indeed a shadow. For example, the caster's position may be estimated to be at the portion of the feature that is closest to the position of the sun at the time the image was captured. For example, as shown in image 200 of FIG. 2, which was captured in the morning, the device may determine that the caster 220 is located at the right-most (east-most) edge of the feature 210/220. In image 400 of FIG. 4, which was captured in the afternoon, the device may determine that the caster 420 is at the left-most (west-most) edge of the feature 410/420. In image 300 of FIG. 3, which was captured at noon and is expected to include relatively few shadows, the device may assume the person-sized features such as 310 are casters. The location of the casters in the earlier images may be compared to the location of the casters in the later images, and if a candidate feature in one image shares a caster location with a candidate feature in another image, both features may be eliminated as a candidate feature.

If a candidate feature is not eliminated as a candidate by the foregoing or other criteria, the device 110 may consider the feature validated, e.g., that the feature is likely to be the shadow of a pedestrian. Device 110 may store the location of each validated shadow as well as the time, including time of day and the calendar day, that the validated shadow was captured by the camera.

The system may use the validated shadow information to determine information about the geographic location at which the validated shadows appear. By way of example, if a significant number of validated shadows are routinely found within a particular area, the system may identify the area as being routinely frequented by pedestrians. If validated shadows are almost never found in a particular area, the system may identify the area as being unpopular with pedestrians (e.g., pedestrian traffic may be prohibited within that area). For example, as shown in FIGS. 2-4, groups of validated shadows such as group 230, 330 and 430 are routinely found in the middle of the images, but none are found in area 250. Accordingly, device 110 may determine that that the geographic location captured in the middle of the images is frequented by pedestrians and that the geographic location at area 250 is off-limits to pedestrians.

If the quantity of validated shadows within an area changes depending on the time of day, day of the week or calendar day, the device may also determine the busiest and slowest times, days of the week and calendar days based on how many shadows are found at the relative time, day or calendar day.

Validated shadow information may also be used as a signal in combination with other signals to identify the nature of the location. For example, if an area is very popular at midday, relatively vacant at dawn and dusk, and adjacent to a body of water, the system may identify the area as a public beach, particularly if the location is proximate to the location of a listing already categorized as a beach. If the system determines that one location often frequented by pedestrians is adjacent to an area that is not frequented by pedestrians, the system may also determine whether any visually-identifiable features separate the two locations from each other. For example, having determined that the pedestrians frequent the area in the middle of the image 200, but not the left and right portions, device 110 may identify visual features that seem to separate the areas, such as the border 240 and fence 260. Similarly, if the area traverses a park and is approximately the width of a sidewalk, and is popular on weekends but relatively vacant during the week, the system may categorize the area as a hiking trail.

Figure 9:
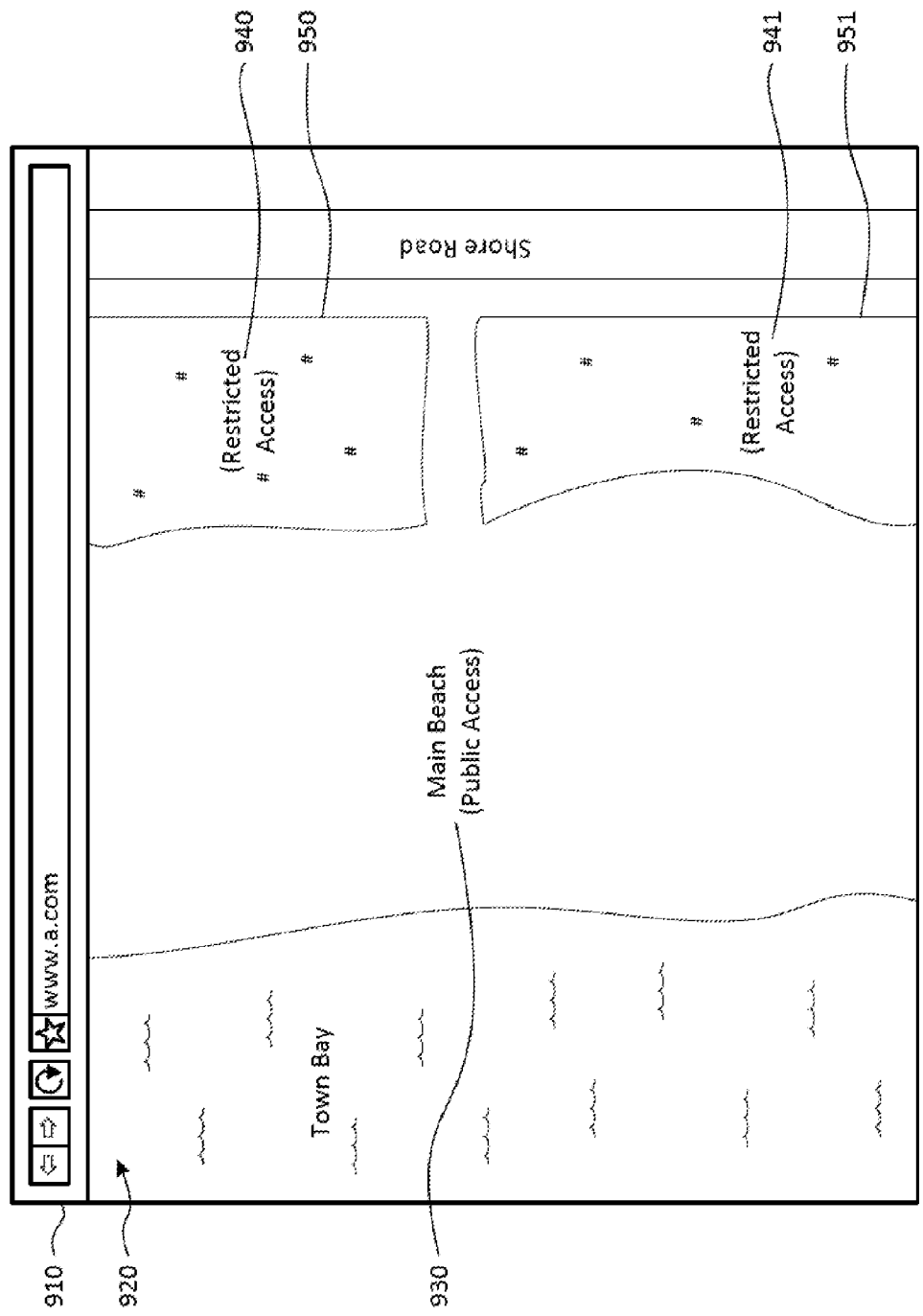
FIG. 9 is a schematic representation of a screen shot displayed to a user.

As shown in FIG. 9, the information determined from the validated shadow information may be conveyed to users later viewing a map of the location. By way of example, in response to a user request for a map of a particular location, display 160 of client device 170 displays a map 920 of a geographic location in browser window 910, the map being received from device 110 via network 195. In addition to annotating the map with the name of the beach obtained from the listing data, the annotation "(Public Access)" may be added to reflect the system's determination that the location likely includes a public beach. Areas where no validated shadows are found, such as areas 950 and 951, may be annotated accordingly such as with the legend "(Restricted Access)".

Based on the validated shadow information, map 920 may also be annotated to identify the busiest and slowest times of the day, or a table may be displayed to the user that lists the relative popularity of the location by hour of the day. If live aerial imagery is available, the system may also provide live updates regarding the amount of people estimated to be at a location.

In addition to identifying pedestrians, the system may also be used in connection with other objects such as bicycles and other vehicles. For example, a shadow template for a bicycle may be calculated to determine bicycle paths. In still another aspect, the system may be used to identify non-fixed objects to remove from a geographical image, such as pedestrians or bicyclists, or cars from roads.

Figure 10:
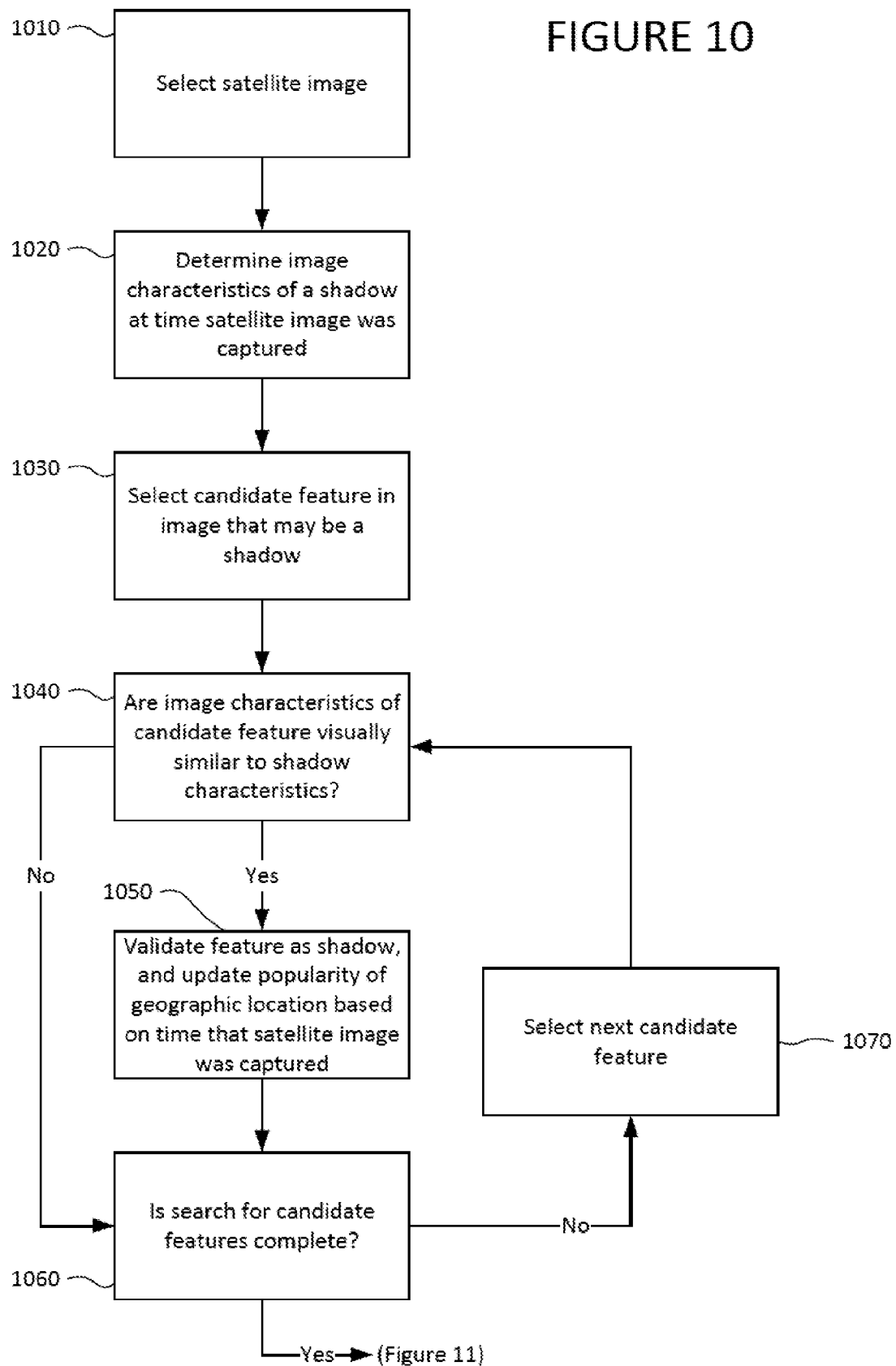
FIG. 10 is an example flow diagram in accordance with aspects of the disclosure.
Figure 11:
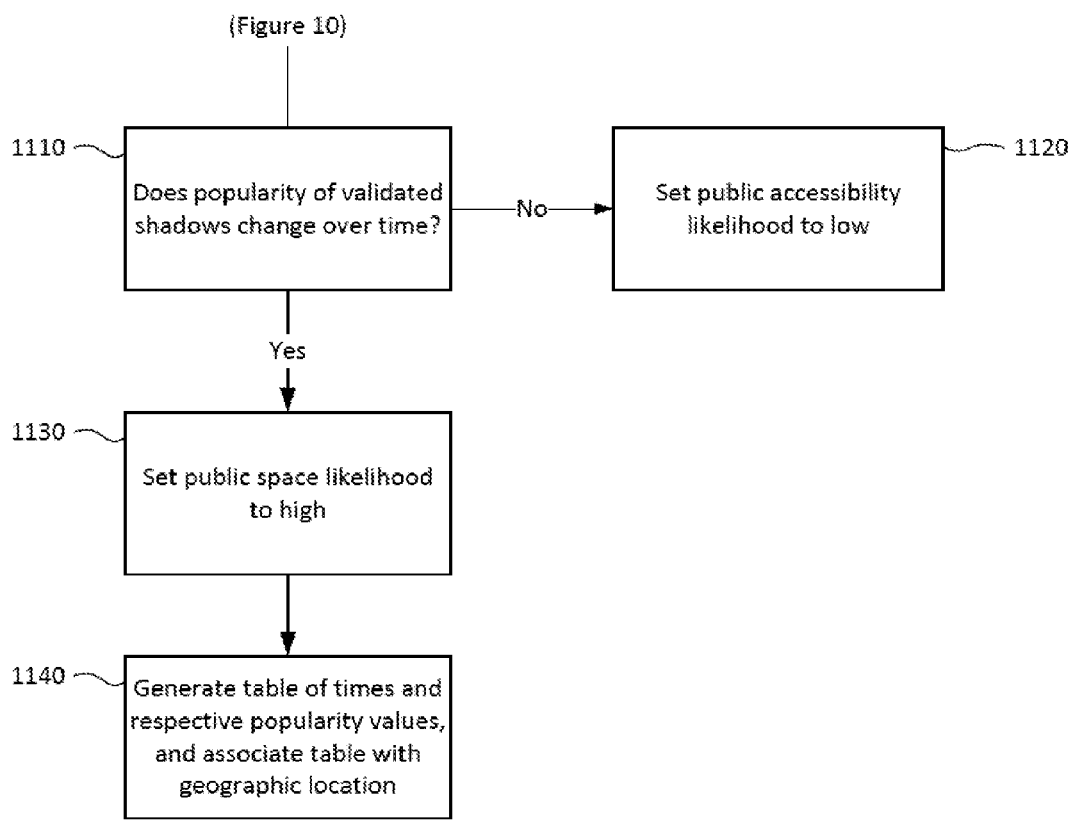
FIG. 11 is an example flow diagram in accordance with aspects of the disclosure.
Figure 12:
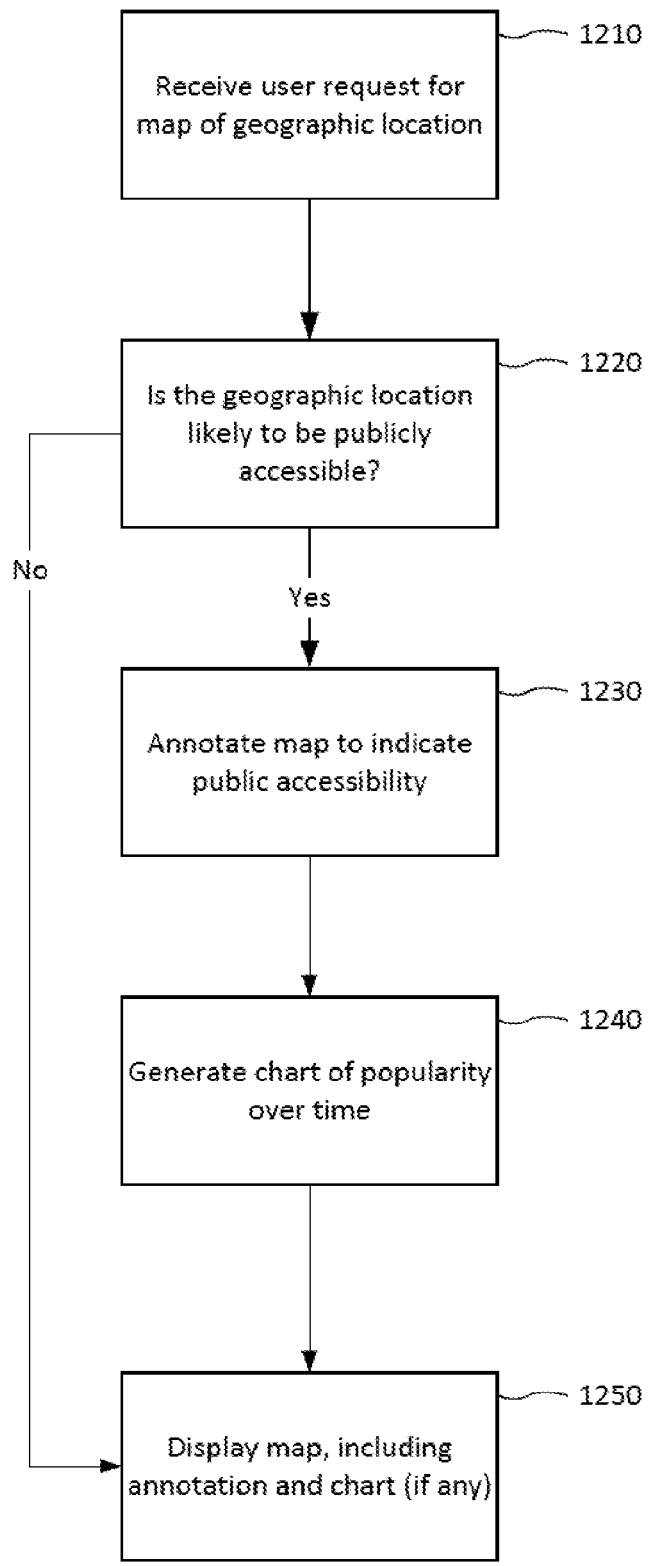
FIG. 12 is an example flow diagram in accordance with aspects of the disclosure.

FIGS. 10-12 are flow charts of various features described above. In block 1010 of FIG. 10, a satellite image is selected for analysis. In block 1020, image characteristics of a shadow are determined based at least in part on the time at which the satellite image was captured. In block 1030, features of the image that may be a shadow are selected as candidates. In block 1040, the system determines whether the image characteristics of the candidate feature are similar to the image characteristics of the shadow. If so, the candidate feature is validated as a shadow and the popularity of the geographic location, such as its popularity with pedestrians, is updated based on the time that the satellite image was captured (block 1050). In either event and as shown in blocks 1060 and 1070, the process of determining whether candidate features are visually similar to shadows, and validating features as a shadow and updating the popularity if so, continues until the search for candidate features is complete.

In block 1110 of FIG. 11, the system determines whether the popularity of the features changes over time. If not, then the likelihood of the geographic location being publicly accessible is set low (block 1120). If the popularity of the features does change over time, then as shown in block 1130 the likelihood of the geographic location being publicly accessible is set high. In block 1140, a table of times and respective popularity values is generated and the table is associated with the geographic location.

In block 1210 of FIG. 12, a user request for a map of the geographic location is received. In block 1220, the system determines whether the geographic location is likely to be publicly accessible. If so, then as shown in block 1230 the map is annotated to indicate that the geographic location is or is likely to be publicly accessible and, as shown in block 1240, a chart is generated that reflects the popularity of the geographic location over time. In block 1250, the map is displayed and if the geographic location has been determined to be likely to be publicly accessible, the annotation and chart are displayed as well.

OTHER EXAMPLE EMBODIMENTS

As these and other variations and combinations of the features discussed above can be utilized without departing from the invention as defined by the claims, the foregoing description of the embodiments should be taken by way of illustration rather than by way of limitation of the invention as defined by the claims. It will also be understood that the provision of examples of the invention (as well as clauses phrased as "such as," "e.g.", "including" and the like) should not be interpreted as limiting the invention to the specific examples; rather, the examples are intended to illustrate only some of many possible aspects.

The invention claimed is:

1. A method of providing a map for display comprising:
determining, by one or more computing devices, whether a first image of a geographic location contains a feature having first image characteristics consistent with image characteristics of a person's shadow, the image being associated with a first time of day of a first calendar day, and the first image characteristics of a person's shadow being based at least in part on the first time of day;
determining, by the one or more computing devices, whether a second image of the geographic location contains a feature having second image characteristics consistent with image characteristics of a person's shadow, the second image being associated with a second time of day of a second calendar day, the image characteristics of a person's shadow being based at least in part on the second time of day, and the second time of day and second calendar day being different from the first time of day and first calendar day, respectively;
determining, by the one or more computing devices, the likelihood of the geographic location being publicly accessible based at least in part on whether the first and second image are both determined to contain image characteristics consistent with image characteristics of a person's shadow;

generating, by one or more computing devices, a map of the geographic location and visual indicia, wherein the visual indicia is indicative of the determined likelihood of the geographic location being publicly accessible; and providing for display, by one or more computing devices, the map of the geographic location and the visual indicia.

2. The method of claim 1 wherein the image characteristics of a person's shadow is based at least in part on the expected visual characteristics of shadow cast by a person when standing or walking.

3. The method of claim 1 wherein the image characteristics of a person's shadow is based at least in part on the expected visual characteristics of shadow cast of a person riding a bicycle.

4. The method of claim 1 wherein the image characteristics of a person's shadow is based at least in part on the latitude of the geographic location and the amount of area captured in the image.

5. The method of claim 1 wherein displaying the visual indicia is based at least in part on whether the image characteristics of the first feature are substantially identical to the image characteristics of the second feature.

6. The method of claim 1 further comprising:

determining the potential location of a first caster of a shadow based on the location of the first feature, determining the potential location of a second caster of a shadow based on the location of the second feature, and generating the visual indicia based at least in part on a determination of whether the determined potential location of the first caster is substantially identical to the determined potential location of the second caster.

7. The method of claim 1 further comprising determining, by one or more computing devices, a value indicative of the likelihood of people being at the geographic location at a plurality of times of day, the value being based at least in part on determining, for a plurality of images of a geographic location captured at different times of day, the number of features within each image having image characteristics consistent with image characteristics of a person's shadow.

8. The method of claim 7 further comprising providing for display to a user, in response to the user's request for information relating to the geographic location and based on the value, an estimate of the likelihood of people being present at the geographic location at a given time of day and calendar day.

9. The method of claim 7 further comprising determining the likelihood of the geographic location being accessible by the public based on the value.

10. A system comprising:

one or more computing devices; and memory containing instructions executable by the one or more computing devices and a plurality of images of a geographic location, at least two images of the plurality being captured on different calendar days and at least two images of the plurality being captured at different times of day;

the instructions comprising:

determining, for each image of the plurality of images, a number of features in the image that are similar to the expected visual characteristic of a person's shadow at the time of day and the calendar day the image was captured, determining, for each of a plurality of different times of day, the likelihood that a geographic location is accessible by the public at the time of day on a given day based at least in part on the number of features that were determined to be similar to the expected visual characteristic of a person's shadow at an associated time of day on a calendar day associated with the given day;

providing, for display, information identifying the likely popularity of the geographic location at different times of day on the given day based on the number of features that were determined for an image associated with the time of day on a calendar day associated with the given day.

11. The system of claim 10 wherein the instructions further comprise determining the likelihood based at least in part on whether the image contains a plurality of features visually similar to the expected visual characteristics of a person's shadow.

12. The system of claim 10 wherein the instructions further comprise determining the likelihood based at least in part on information relating to the geographic location that is not contained in the image.

13. The system of claim 12 wherein the information relating to the geographic location that is not contained in the image comprises a category stored in memory and associated with the location.

14. The system of claim 10 wherein the instructions further comprise identifying a pedestrian trail based on the location of features visually similar to the expected visual characteristics of a person's shadow.

15. A non-transitory, tangible computer-readable medium on which instructions are stored, the instructions, when executed by one or more computing devices, to perform a method, the method comprising:

determining, by the one or more computing devices, the expected length and orientation of a person's shadow that may appear in a first aerial image based on the time that the first image was captured, determining, by the one of more computing devices, the geographic location of one or more features within the first image that are similar to the expected size and orientation of a person's shadow, determining, by the one or more computing devices, the expected size and orientation of a person's shadow that may appear in a second aerial image based on the time that the second image was captured, determining, by the one of more computing devices, the geographic location of one or more features within the second image that are similar to the expected size and orientation of a person's shadow, determining, by the one of more computing devices, whether the first and second image capture shadows of people based at least in part on comparing the geographic locations of one or more features within the first image that are similar to the expected size and orientation of a person's shadow with the geographic locations of one or more features within the second image that are similar to the expected size and orientation of a person's shadow, and determining, by the one or computing devices, a first geographic area that contains at least two different geographic locations that were determined to be similar to the expected size and orientation of a person's shadow and a second geographic area that does not contain one of the geographic locations that was determined to be similar to the expected size and orientation of a person's shadow, providing for display to a user, in response to receiving a request from the user, a map of the first and second geographic area wherein the map indicates that the first geographic area is frequented by people and does not indicate that the second geographic area is frequented by people.

16. The non-transitory, tangible computer-readable medium of claim 15 wherein the portion of the map that is frequented by people is indicated by displaying a trail.

17. The non-transitory, tangible computer-readable medium of claim 15 wherein the information provided for display is based at least in part on a comparison of the amount of features within the first image that are similar to the expected size and orientation of a person's shadow with the amount of features within the second image that are similar to the expected size and orientation of a person's shadow.

18. The non-transitory, tangible computer-readable medium of claim 15 wherein the information provided for display identifies one or more times that the first geographic area is frequented by people based on the time that the first image was captured and the time that the second image was captured.

* * * * *